US010855686B2

(12) United States Patent
Shah

(10) Patent No.: US 10,855,686 B2
(45) Date of Patent: Dec. 1, 2020

(54) PREVENTING UNAUTHORIZED ACCESS TO SECURE INFORMATION SYSTEMS USING MULTI-PUSH AUTHENTICATION TECHNIQUES

(71) Applicant: Bank of America Corporation, Charlotte, NC (US)

(72) Inventor: Hitesh Shah, Seattle, WA (US)

(73) Assignee: Bank of America Corporation, Charlotte, NC (US)

( * ) Notice: Subject to any disclaimer, the term of this patent is extended or adjusted under 35 U.S.C. 154(b) by 292 days.

(21) Appl. No.: 15/948,245

(22) Filed: Apr. 9, 2018

(65) Prior Publication Data
US 2019/0312880 A1 Oct. 10, 2019

(51) Int. Cl.
*H04L 29/06* (2006.01)
(52) U.S. Cl.
CPC ............ *H04L 63/104* (2013.01); *H04L 63/08* (2013.01); *H04L 63/0853* (2013.01); *H04L 63/0838* (2013.01)
(58) Field of Classification Search
CPC .............................. H04L 12/00; G06F 13/00
See application file for complete search history.

(56) References Cited

U.S. PATENT DOCUMENTS

| 8,584,225 | B1 | 11/2013 | Kennedy et al. |
| 8,763,089 | B2 | 6/2014 | Qureshi et al. |
| 9,276,917 | B2 | 3/2016 | McColgan |
| 2005/0289383 | A1* | 12/2005 | Illowsky ............... G06F 1/3203 714/2 |
| 2014/0007213 | A1 | 1/2014 | Sanin et al. |
| 2017/0339250 | A1 | 11/2017 | Momchilov et al. |
| 2017/0339564 | A1 | 11/2017 | Momchilov et al. |
| 2017/0346813 | A1 | 11/2017 | Ibrahim et al. |
| 2017/0346851 | A1 | 11/2017 | Drake |
| 2017/0357799 | A1 | 12/2017 | Feher et al. |
| 2017/0359339 | A1 | 12/2017 | Hevizi et al. |
| 2017/0359342 | A1 | 12/2017 | Magyar et al. |
| 2017/0359723 | A1 | 12/2017 | Pal et al. |
| 2017/0364875 | A1 | 12/2017 | Efroni et al. |
| 2017/0364911 | A1 | 12/2017 | Landrok et al. |
| 2017/0366527 | A1 | 12/2017 | Oxford et al. |

(Continued)

*Primary Examiner* — Joseph P Hirl
*Assistant Examiner* — Leynna Truvan
(74) *Attorney, Agent, or Firm* — Banner & Witcoff, Ltd.; Michael A. Springs

(57) ABSTRACT

Aspects of the disclosure relate to preventing unauthorized access to secured information systems using multi-push authentication techniques. A computing platform may receive an event request associated with a group of enrolled devices. The computing platform may load multi-push settings and identify one or more user devices linked to the group of enrolled devices. Then, the computing platform may generate one or more notifications for the one or more user devices, and each notification may be generated for a corresponding user device based on device-specific user account state information. After sending the one or more notifications, the computing platform may generate one or more event execution commands based on prompt response information received from the one or more user devices and may send the one or more event execution commands to an event management computer system, which may execute an event corresponding to the event request.

20 Claims, 13 Drawing Sheets

(56) References Cited

U.S. PATENT DOCUMENTS

| | | |
|---|---|---|
| 2017/0374070 A1 | 12/2017 | Shah et al. |
| 2018/0004930 A1 | 1/2018 | Csinger et al. |
| 2018/0027129 A1 | 1/2018 | Sharma |
| 2018/0027413 A1 | 1/2018 | Hanley et al. |
| 2018/0039990 A1 | 2/2018 | Lindemann |
| 2018/0041503 A1 | 2/2018 | Lindemann |
| 2018/0041507 A1 | 2/2018 | Sivarajan et al. |
| 2018/0048472 A1 | 2/2018 | Pirrwitz et al. |
| 2018/0049026 A1 | 2/2018 | Mistry et al. |
| 2018/0050661 A1 | 2/2018 | Shim et al. |
| 2018/0053018 A1 | 2/2018 | Baskaran et al. |
| 2018/0054405 A1 | 2/2018 | Ritch et al. |
| 2018/0062863 A1 | 3/2018 | Baskaran et al. |
| 2018/0068103 A1 | 3/2018 | Pitkanen et al. |
| 2018/0096296 A1 | 4/2018 | Papancea et al. |
| 2018/0097787 A1 | 4/2018 | Murthy et al. |
| 2018/0097788 A1 | 4/2018 | Murthy |
| 2018/0097789 A1 | 4/2018 | Murthy et al. |
| 2018/0097840 A1 | 4/2018 | Murthy |

* cited by examiner

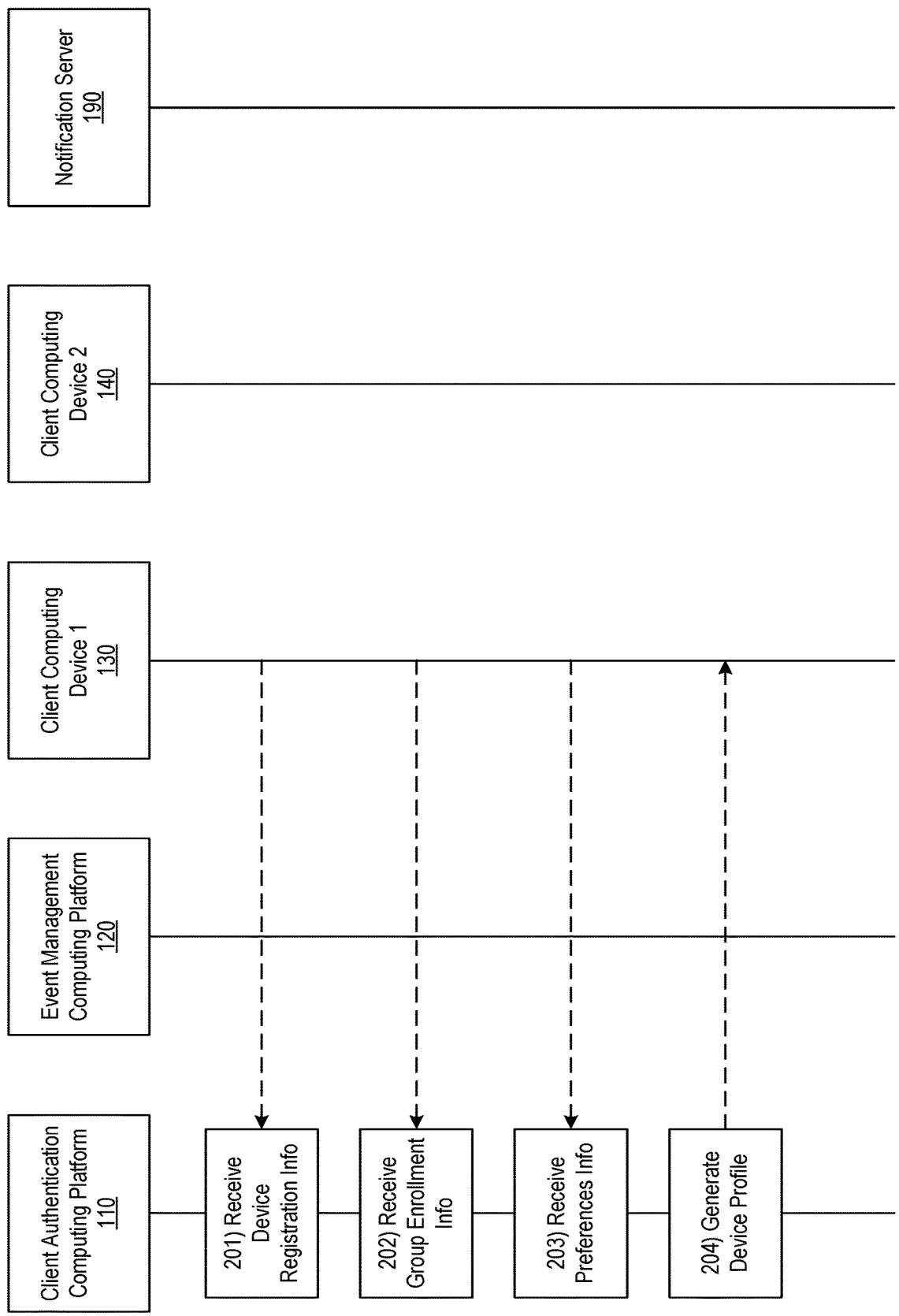

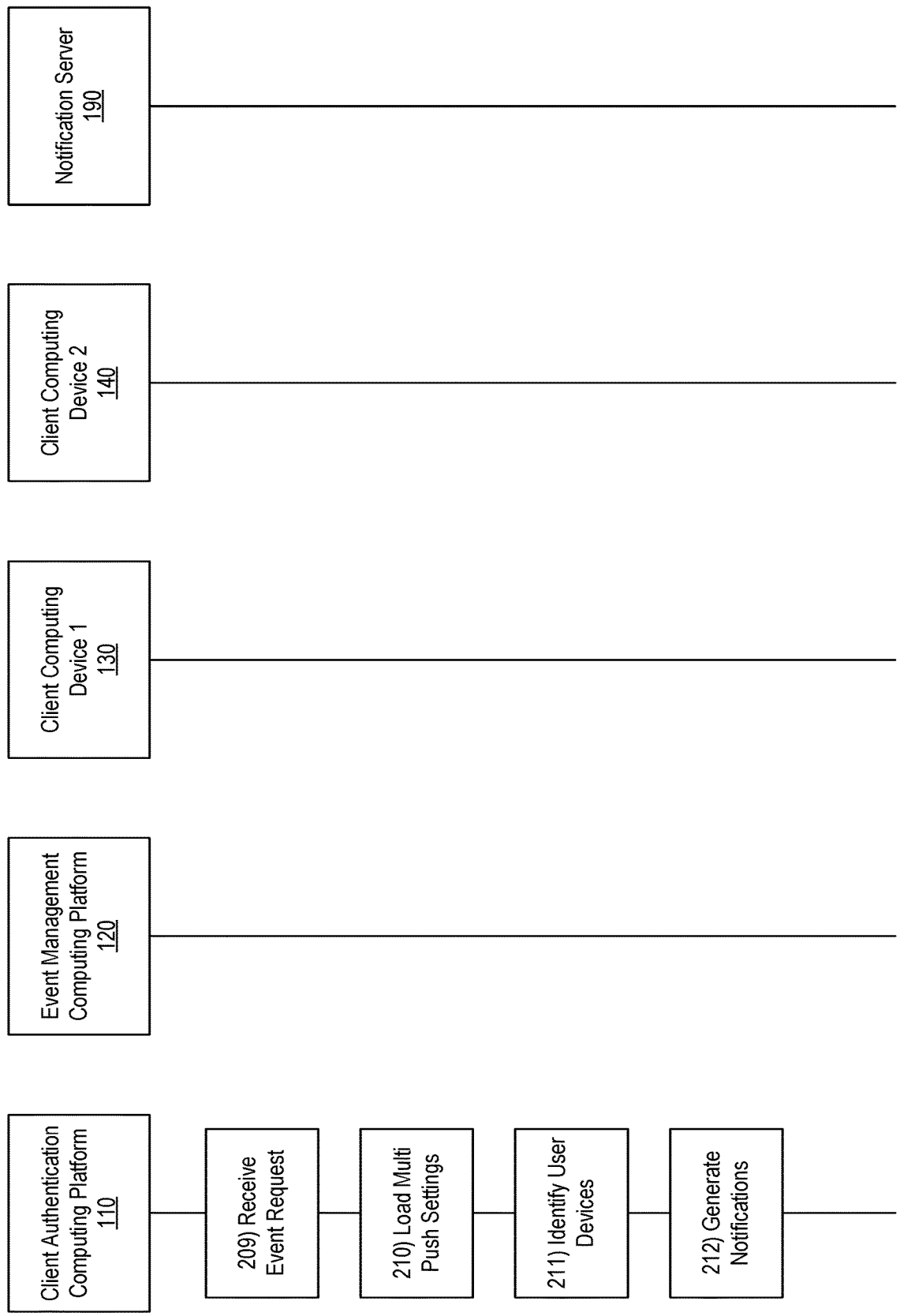

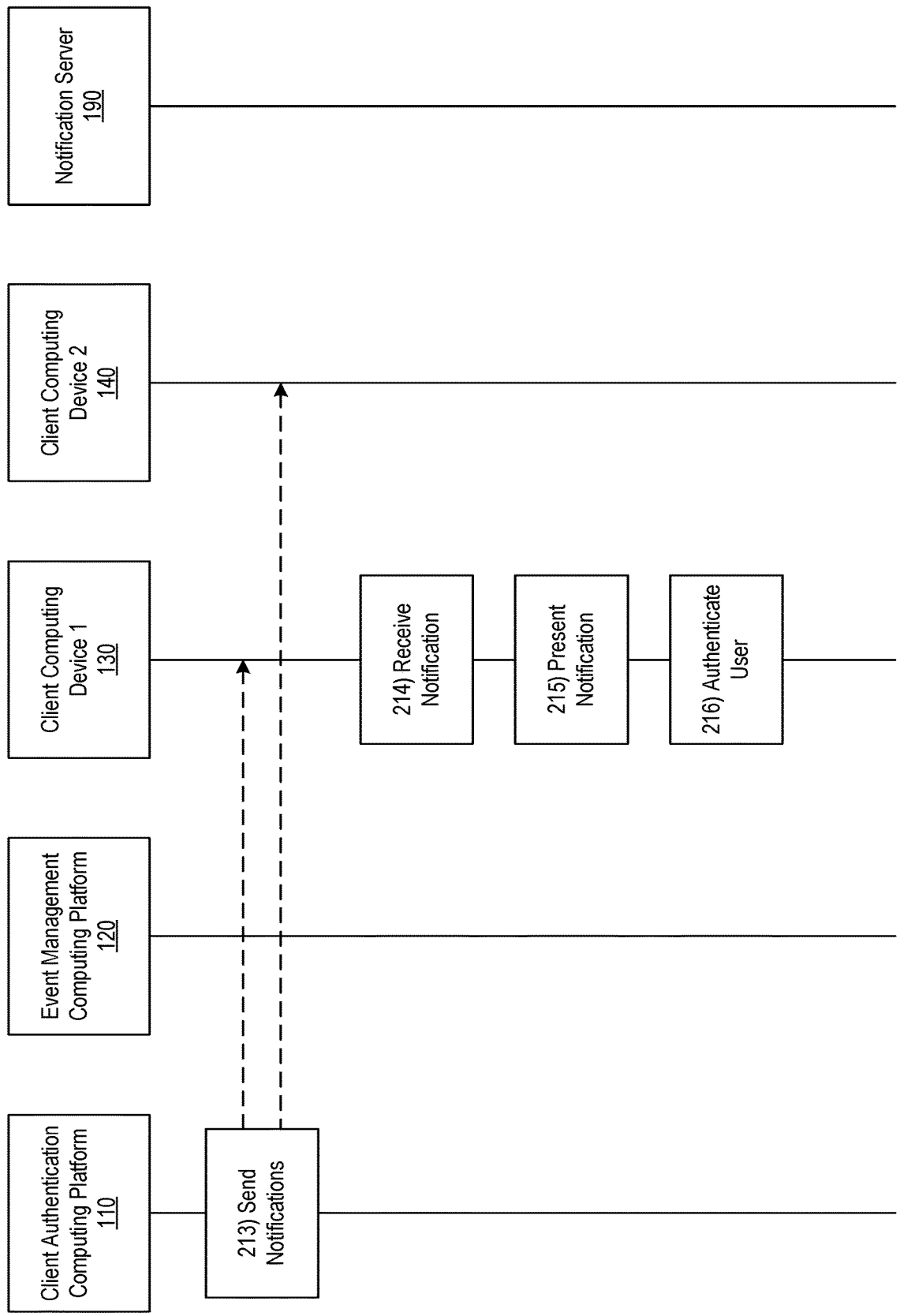

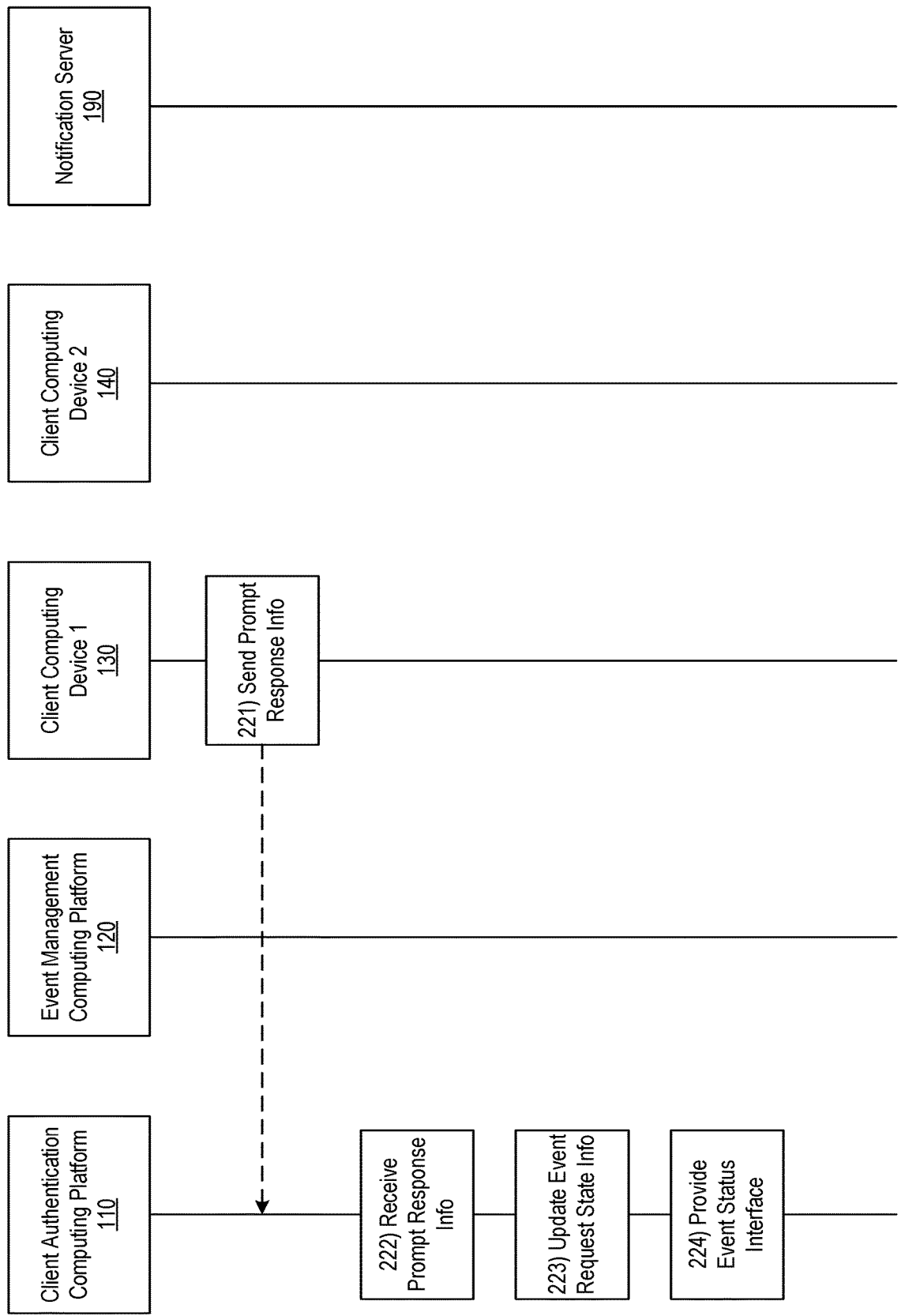

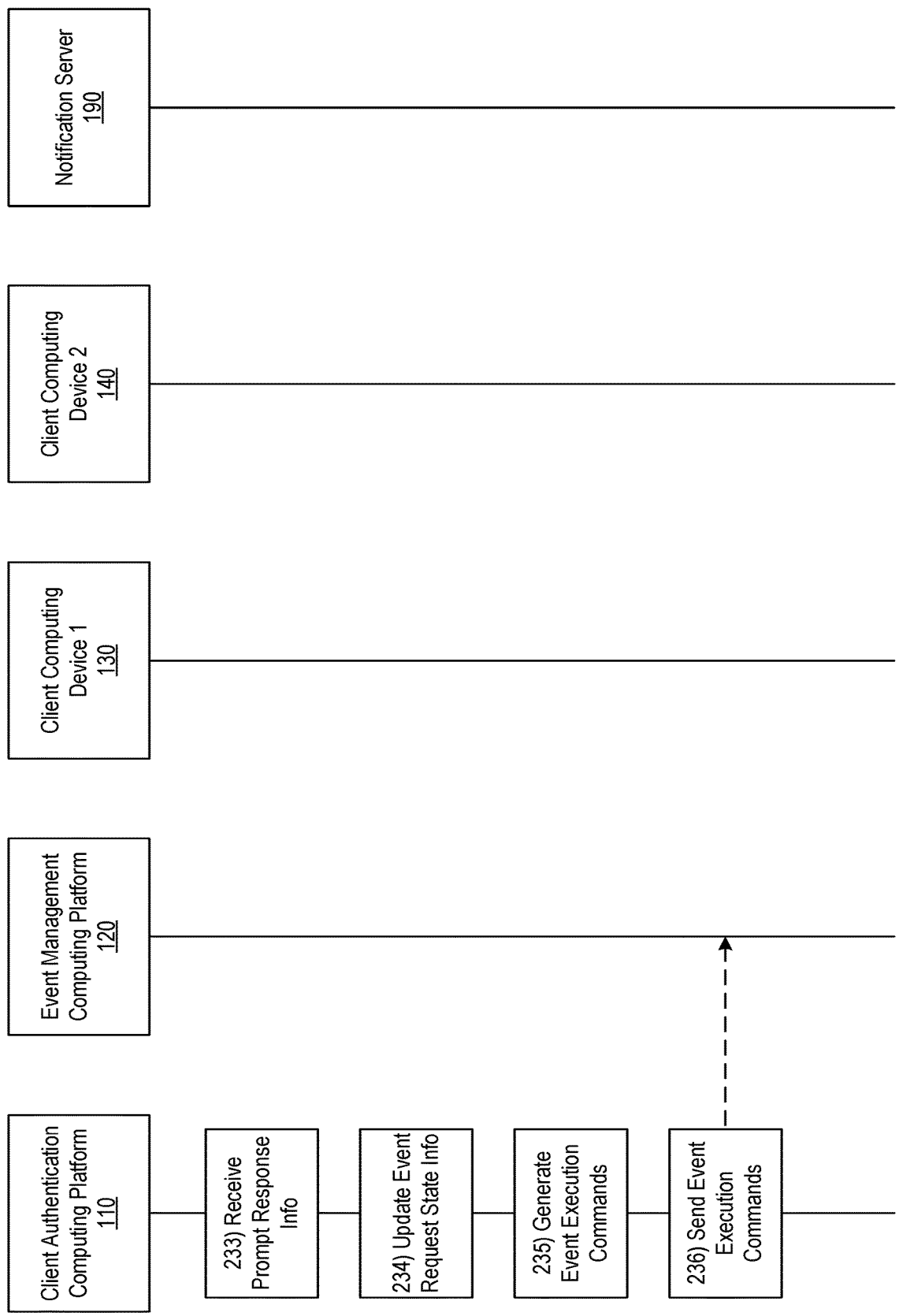

PREVENTING UNAUTHORIZED ACCESS TO SECURE INFORMATION SYSTEMS USING MULTI-PUSH AUTHENTICATION TECHNIQUES

BACKGROUND

Aspects of the disclosure relate to providing information security and preventing unauthorized access to resources of an information system. In particular, one or more aspects of the disclosure relate to preventing unauthorized access to secured information systems using multi-push authentication techniques.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by implementing multi-push authentication techniques.

In accordance with one or more embodiments, a computing platform having at least one processor, a communication interface, and memory may receive, via the communication interface, from a requesting device, an event request associated with a group of enrolled devices. Based on receiving the event request associated with the group of enrolled devices from the requesting device, the computing platform may load multi-push settings associated with the group of enrolled devices. Subsequently, the computing platform may identify one or more user devices linked to the group of enrolled devices based on the multi-push settings associated with the group of enrolled devices. The computing platform may generate one or more notifications for the one or more user devices linked to the group of enrolled devices, and each notification of the one or more notifications may be generated for a corresponding user device of the one or more user devices linked to the group of enrolled devices based on device-specific user account state information maintained by the computing platform. Then, the computing platform may send, via the communication interface, to the one or more user devices linked to the group of enrolled devices, the one or more notifications generated for the one or more user devices linked to the group of enrolled devices. Thereafter, the computing platform may generate one or more event execution commands based on prompt response information received from the one or more user devices linked to the group of enrolled devices. Subsequently, the computing platform may send, via the communication interface, to an event management computer system, the one or more event execution commands generated based on the prompt response information received from the one or more user devices linked to the group of enrolled devices, and sending the one or more event execution commands to the event management computer system may cause the event management computer system to execute an event corresponding to the event request associated with the group of enrolled devices received from the requesting device.

In some embodiments, generating the one or more notifications for the one or more user devices linked to the group of enrolled devices may include generating a first notification for a first user device of the one or more user devices linked to the group of enrolled devices based on first user account state information corresponding to the first user device. In addition, sending the first notification to the first user device may cause the first user device to require a first set of authenticators when authenticating a user of the first user device. Further, generating the one or more notifications for the one or more user devices linked to the group of enrolled devices may include generating a second notification for a second user device of the one or more user devices linked to the group of enrolled devices based on second user account state information corresponding to the second user device. In addition, sending the second notification to the second user device may cause the second user device to require a second set of authenticators when authenticating a user of the second user device. The second user account state information may be different from the first user account state information, and the second set of authenticators may be different from the first set of authenticators.

In some embodiments, sending the one or more notifications generated for the one or more user devices linked to the group of enrolled devices may include concurrently sending the one or more notifications to the one or more user devices linked to the group of enrolled devices. In some embodiments, sending the one or more notifications generated for the one or more user devices linked to the group of enrolled devices may include sequentially sending the one or more notifications to the one or more user devices linked to the group of enrolled devices. In some embodiments, sending the one or more notifications generated for the one or more user devices linked to the group of enrolled devices may include sending the one or more notifications to the one or more user devices linked to the group of enrolled devices in a specific order based on the multi-push settings associated with the group of enrolled devices.

In some embodiments, generating the one or more event execution commands based on the prompt response information received from the one or more user devices linked to the group of enrolled devices may include generating the one or more event execution commands based on a quorum of the one or more user devices linked to the group of enrolled devices approving the event request. In some embodiments, generating the one or more event execution commands based on the prompt response information received from the one or more user devices linked to the group of enrolled devices may include generating the one or more event execution commands based on all of the one or more user devices linked to the group of enrolled devices approving the event request.

In some embodiments, sending the one or more notifications to the one or more user devices linked to the group of enrolled devices may include sending a first notification to a first user device, and sending the first notification to the first user device may cause the first user device to present information associated with the first notification, authenticate a user of the first user device, present a first prompt corresponding to the event request, and send first prompt response information to the computing platform. In some embodiments, sending the one or more notifications to the one or more user devices linked to the group of enrolled devices may include sending a second notification to a second user device, and sending the second notification to the second user device may cause the second user device to present information associated with the second notification, authenticate a user of the second user device, present a second prompt corresponding to the event request, and send second prompt response information to the computing platform.

In some embodiments, the computing platform may receive, via the communication interface, from the first user device, validation information associated with the user of the first user device being authenticated. In some embodiments, the computing platform may receive, via the communication interface, from the first user device, the first prompt response information. In addition, the computing platform may update event request state information based on receiving the first prompt response information from the first user device.

In some embodiments, the computing platform may receive, via the communication interface, from the second user device, validation information associated with the user of the second user device being authenticated. In some embodiments, the computing platform may receive, via the communication interface, from the second user device, the second prompt response information. In addition, the computing platform may update the event request state information based on receiving the second prompt response information from the second user device.

In some embodiments, the computing platform may provide an event status interface to the requesting device based on receiving one or more of the first prompt response information from the first user device or the second prompt response information from the second user device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for preventing unauthorized access to secured information systems using multi-push authentication techniques in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
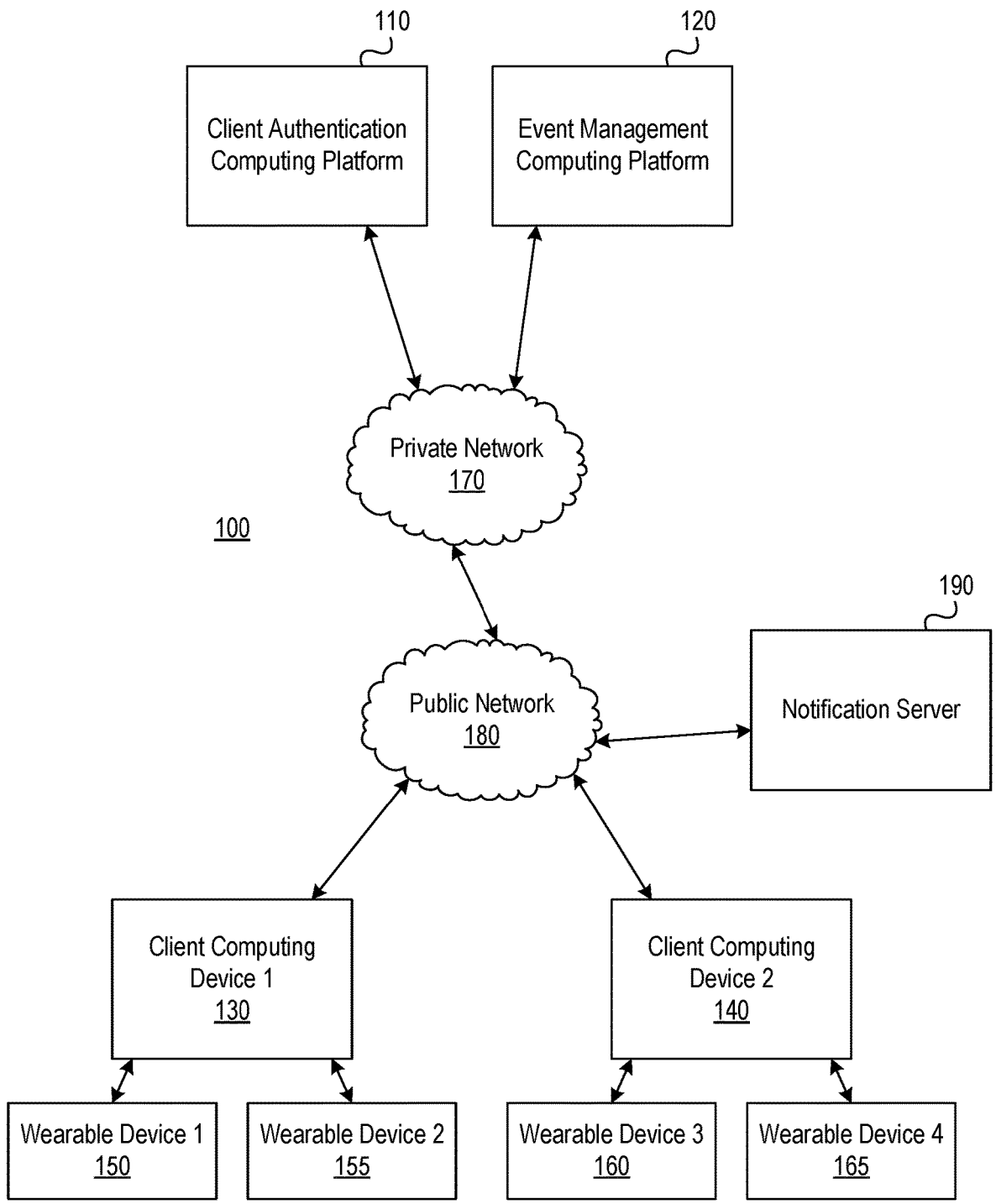
FIGS. 1A and 1B depict an illustrative computing environment for preventing unauthorized access to secured information systems using multi-push authentication techniques in accordance with one or more example embodiments.
Figure 1B:
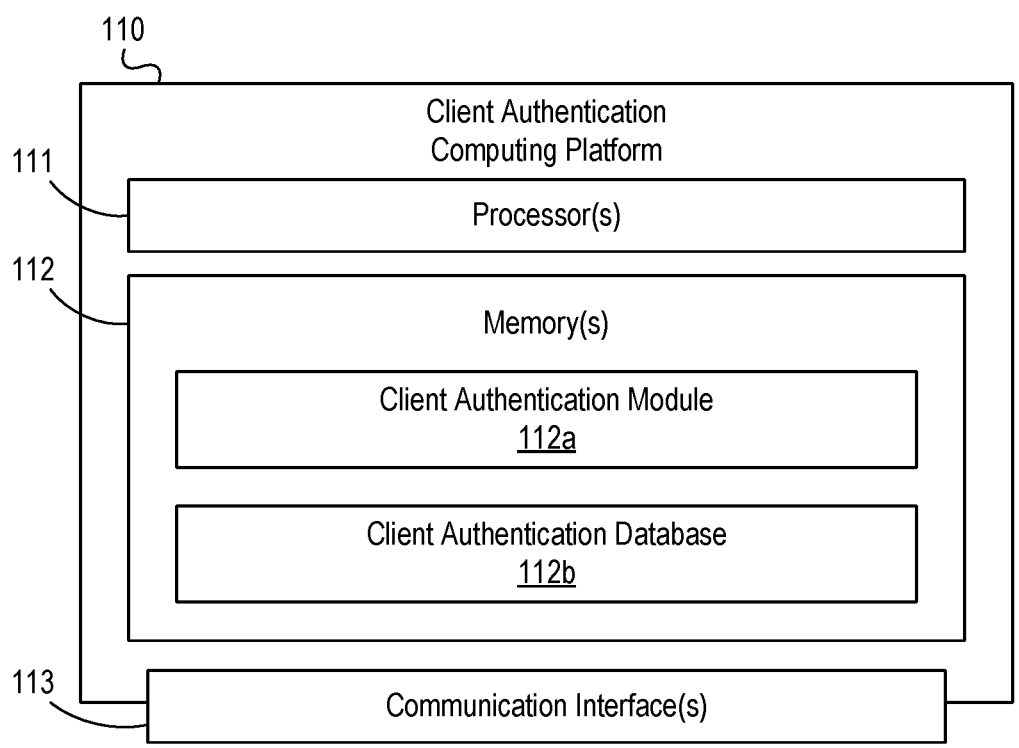

FIGS. 1A and 1B depict an illustrative computing environment for preventing unauthorized access to secured information systems using multi-push authentication techniques in accordance with one or more example embodiments. Referring to FIG. 1A, computing environment 100 may include one or more computer systems. For example, computing environment 100 may include a client authentication computing platform 110, an event management computing platform 120, a first client computing device 130, a second client computing device 140, a first wearable device 150, a second wearable device 155, a third wearable device 160, a fourth wearable device 165, and an notification server 190.

As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Event management computing platform 120 may include one or more computing devices and/or other computer components (e.g., processors, memories, communication interfaces). In addition, and as illustrated in greater detail below, event management computing platform 120 may be configured to store, maintain, and/or update information about events that have been requested, are in progress, or have been completed. Additionally or alternatively, event management computing platform 120 may be configured to execute events, for instance, by updating its own databases, by writing data to other databases, and/or by commanding and/or controlling other systems and/or devices. In some instances, one or more events may be or correspond to a transfer of funds from one account to another, a money transfer associated with an estate, a transaction associated with a group or joint account (e.g., an investment club account), an endorsement for a joint account, a contractual agreement, a mortgage loan documentation requirement or transaction, or the like. In some instances, one or more events may be defined via a client portal provided by event management computing platform 120 and/or one or more other systems and/or devices included in computing environment 100. Such a client portal may be hosted by an organization, and may be an online banking portal or a mobile banking portal provided by a financial institution. In addition, such a portal may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Client computing device 130 may be a personal computing device (e.g., desktop computer, laptop computer) or mobile computing device (e.g., smartphone, tablet) that may be linked to and/or used by a first user (who may, e.g., be a client of an organization operating client authentication computing platform 110 and/or event management computing platform 120). Wearable device 150 may be a wearable computing device (e.g., smart watch, fitness tracker, electronic necklace, electronic ring, heart rate monitor, walking gait sensor, blood pressure monitor) that may be linked to and/or used by the first user of client computing device 130. Wearable device 155 may be another wearable computing device (e.g., smart watch, fitness tracker, electronic necklace, electronic ring, heart rate monitor, walking gait sensor, blood pressure monitor) that may be linked to and/or used by the first user of client computing device 130.

Client computing device 140 may be a personal computing device (e.g., desktop computer, laptop computer) or mobile computing device (e.g., smartphone, tablet) that may be linked to and/or used by a second user (who may, e.g., be a client of an organization operating client authentication computing platform 110 and/or event management computing platform 120 different from the first user of client computing device 130). Wearable device 160 may be a wearable computing device (e.g., smart watch, fitness tracker, electronic necklace, electronic ring, heart rate monitor, walking gait sensor, blood pressure monitor) that may be linked to and/or used by the second user of client computing device 140. Wearable device 165 may be another wearable computing device (e.g., smart watch, fitness tracker, electronic necklace, electronic ring, heart rate monitor, walking gait sensor, blood pressure monitor) that may be linked to and/or used by the second user of client computing device 140.

Notification server 190 may include one or more computing devices and/or other computer components (e.g., processors, memories, communication interfaces). In addition, and as illustrated in greater detail below, notification server 190 may be configured to provide a notification service, which may, e.g., be exposed to external systems and/or devices by one or more application programming interfaces, and which may, e.g., be utilized by client authentication computing platform 110 and/or event management computing platform 120 to push and/or otherwise send one or more notifications to client computing device 130, client computing device 140, and/or one or more other systems and/or devices.

Computing environment 100 also may include one or more networks, which may interconnect one or more of client authentication computing platform 110, event management computing platform 120, client computing device 130, client computing device 140, wearable device 150, wearable device 155, wearable device 160, wearable device 165, and notification server 190. For example, computing environment 100 may include a private network 170 (which may, e.g., interconnect client authentication computing platform 110, event management computing platform 120, and/or one or more other systems associated with an organization operating client authentication computing platform 110 and event management computing platform 120) and public network 180 (which may, e.g., interconnect client computing device 130, client computing device 140, notification server 190, and/or one or more other systems, public networks, sub-networks, and/or the like).

In one or more arrangements, client computing device 130, client computing device 140, and/or the other systems included in computing environment 100 may be any type of computing device capable of receiving a user interface, receiving input via the user interface, and communicating the received input to one or more other computing devices. For example, client computing device 130, client computing device 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of client authentication computing platform 110, event management computing platform 120, client computing device 130, client computing device 140, wearable device 150, wearable device 155, wearable device 160, wearable device 165, and notification server 190 may, in some instances, be special-purpose computing devices configured to perform specific functions.

Referring to FIG. 1B, client authentication computing platform 110 may include one or more processors 111, memory 112, and communication interface 113. A data bus may interconnect processor 111, memory 112, and communication interface 113. Communication interface 113 may be a network interface configured to support communication between client authentication computing platform 110 and one or more networks (e.g., network 170, network 180, or the like). Memory 112 may include one or more program modules having instructions that when executed by processor 111 cause client authentication computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 112$a$ and a client authentication database 112$b$. Client authentication module 112$a$ may have instructions that direct and/or cause client authentication computing platform 110 to control access to resources of an information system by implementing multi-push authentication techniques, as discussed in greater detail below. Client authentication database 112$b$ may store information used by client authentication module 112$a$ and/or client authentication computing platform 110 in controlling access to resources of an information system by implementing multi-push authentication techniques and/or in performing other functions.

Figure 2B:
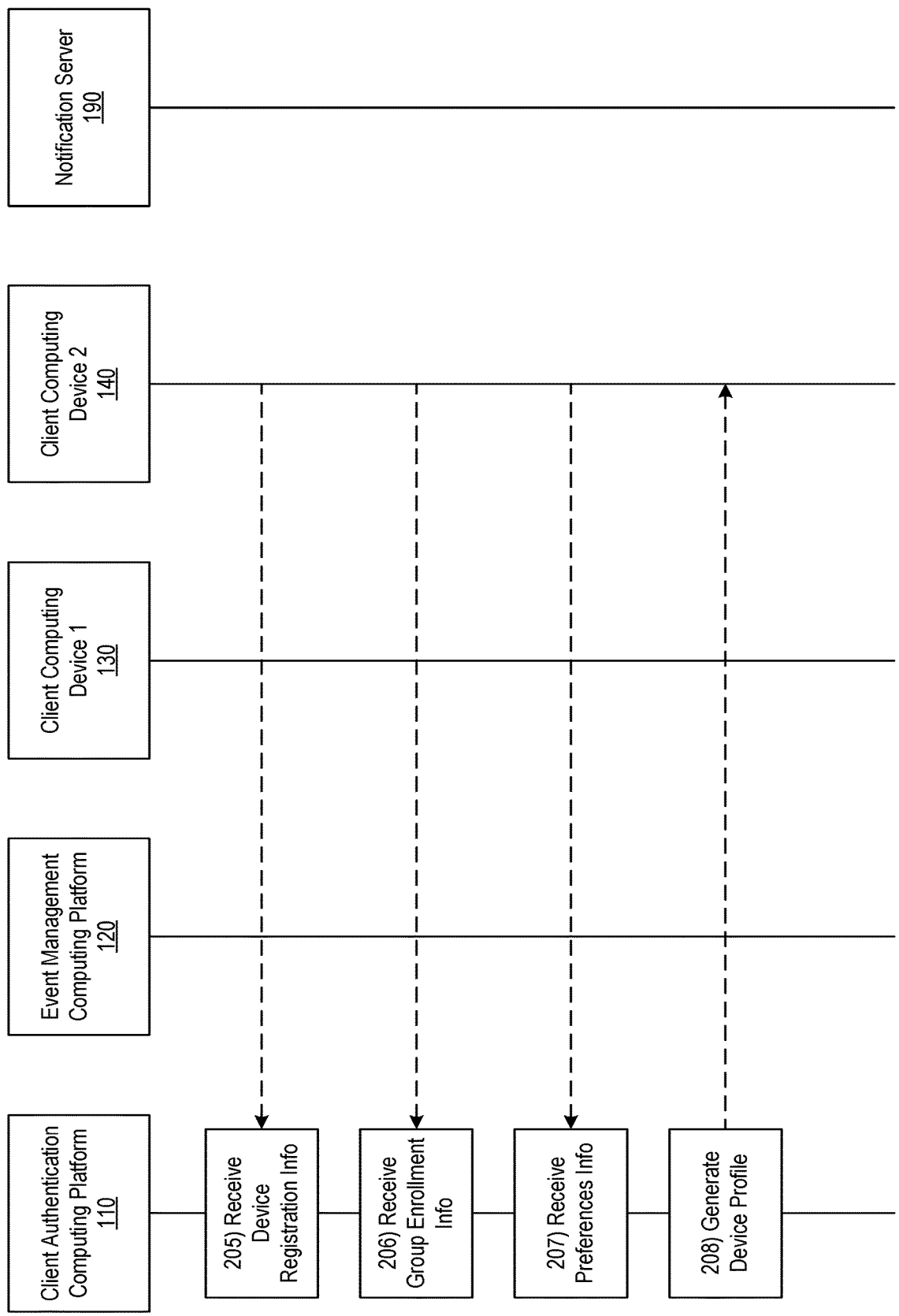

FIGS. 2A-2I depict an illustrative event sequence for preventing unauthorized access to secured information systems using multi-push authentication techniques in accordance with one or more example embodiments. Referring to FIG. 2A, at step 201, client authentication computing platform 110 may receive device registration information from client computing device 130. The device registration information received from client computing device 130 may, for instance, include a user identifier associated with a user of client computing device 130, a unique device identifier assigned to and/or otherwise associated with client computing device 130, and/or other information linking particular user accounts (which may, e.g., be associated with records maintained by client authentication computing platform 110 and/or event management computing platform 120) with the particular user device (e.g., client computing device 130).

At step 202, client authentication computing platform 110 may receive group enrollment information from client computing device 130. The group enrollment information received from client computing device 130 may, for instance, include information linking one or more specific user accounts to one or more specific groups, which may, for instance, be and/or correspond to joint accounts and/or multi-party transactions (which may, e.g., be a transaction requiring two or more different entities and/or users to approve the transaction before it can be processed and/or otherwise completed).

At step 203, client authentication computing platform 110 may receive preferences information from client computing device 130. The preferences information received from client computing device 130 may, for instance, include user preferences information (which may, e.g., define which device(s) the user of client computing device 130 prefers to receive notifications on, which groups the user of client computing device 130 manages and/or is a member of, and/or the like) and/or group preferences information (which may, e.g., define members of groups associated with the user of client computing device 130, what types of requests require multi-party approval, whether all users in the group must approve or only a quorum for the request to proceed, whether notifications should be sent concurrently to all users in the group or sequentially in a specific order to specific group members, and/or the like).

At step 204, client authentication computing platform 110 may generate a device profile for client computing device 130. For example, at step 204, client authentication computing platform 110 may generate a device profile for client computing device 130 based on the device registration information, the group enrollment information, and/or the preferences information received from client computing device 130, and client authentication computing platform 110 may send the device profile to client computing device 130.

Referring to FIG. 2B, at step 205, client authentication computing platform 110 may receive device registration information from client computing device 140. The device registration information received from client computing device 140 may, for instance, include a user identifier associated with a user of client computing device 140, a unique device identifier assigned to and/or otherwise associated with client computing device 140, and/or other information linking particular user accounts (which may, e.g., be associated with records maintained by client authentication computing platform 110 and/or event management computing platform 120) with the particular user device (e.g., client computing device 140).

At step 206, client authentication computing platform 110 may receive group enrollment information from client computing device 140. The group enrollment information received from client computing device 140 may, for instance, include information linking one or more specific user accounts to one or more specific groups, which may, for instance, be and/or correspond to joint accounts and/or multi-party transactions.

At step 207, client authentication computing platform 110 may receive preferences information from client computing device 140. The preferences information received from client computing device 140 may, for instance, include user preferences information (which may, e.g., define which device(s) the user of client computing device 140 prefers to receive notifications on, which groups the user of client computing device 140 manages and/or is a member of, and/or the like) and/or group preferences information (which may, e.g., define members of groups associated with the user of client computing device 140, what types of requests require multi-party approval, whether all users in the group must approve or only a quorum for the request to proceed, whether notifications should be sent concurrently to all users in the group or sequentially in a specific order to specific group members, and/or the like).

At step 208, client authentication computing platform 110 may generate a device profile for client computing device 140. For example, at step 208, client authentication computing platform 110 may generate a device profile for client computing device 140 based on the device registration information, the group enrollment information, and/or the preferences information received from client computing device 140, and client authentication computing platform 110 may send the device profile to client computing device 140.

Referring to FIG. 2C, at step 209, client authentication computing platform 110 may receive an event request. For example, at step 209, client authentication computing platform 110 may receive, via the communication interface (e.g., communication interface 113), from a requesting device, an event request associated with a group of enrolled devices. The requesting device may, for instance, be another user device (e.g., similar to client computing device 130 and client computing device 140) that is linked to a particular group. In addition, the event request may, for instance, be and/or correspond to a request for funds from a teen or minor user, a money transfer request for estate, a transaction for investment club, an endorsement for a joint account, a contractual agreement, a mortgage loan document signing request or transaction, or any other type of transaction which may, for instance, require approval from two or more different entities or users.

At step 210, client authentication computing platform 110 may load multi-push settings for the group or account associated with the event request. For example, at step 210, based on receiving the event request associated with the group of enrolled devices from the requesting device, client authentication computing platform 110 may load multi-push settings associated with the group of enrolled devices. Such settings may, for instance, be loaded from a database maintained by client authentication computing platform 110.

At step 211, client authentication computing platform 110 may identify one or more user devices linked to the group or account associated with the event request. For example, at step 211, client authentication computing platform 110 may identify one or more user devices linked to the group of enrolled devices based on the multi-push settings associated with the group of enrolled devices. In the example illustrated below, client authentication computing platform 110 may, for instance, identify client computing device 130 and client computing device 140 as the one or more user devices linked to the group of enrolled devices.

At step 212, client authentication computing platform 110 may generate one or more notifications for the identified user devices. For example, at step 212, client authentication computing platform 110 may generate one or more notifications for the one or more user devices (e.g., client computing device 130, client computing device 140) linked to the group of enrolled devices. In addition, each notification of the one or more notifications may be generated by client authentication computing platform 110 for a corresponding user device of the one or more user devices (e.g., client computing device 130, client computing device 140) linked to the group of enrolled devices based on device-specific user account state information maintained by the computing platform (e.g., client authentication computing platform 110). For instance, client authentication computing platform 110 may check user account state information for the different user accounts linked to the different devices and then generate different notifications, with different authentication requirements, for each of the different devices based on each particular user account's state information. Client authentication computing platform 110 may maintain such user account state information for a multitude, if not all, of the user accounts associated with an enterprise user base, such as all of the user accounts associated with an online banking portal provided by a financial institution. In addition, client authentication computing platform 110 may update and/or adjust each individual user account's state based on account-specific risk information (e.g., failed login attempts, recent transaction history, device profile information, and/or other information informative of a particular user account's risk state).

In some embodiments, generating the one or more notifications for the one or more user devices linked to the group of enrolled devices may include generating a first notification for a first user device of the one or more user devices linked to the group of enrolled devices based on first user account state information corresponding to the first user device, and generating a second notification for a second user device of the one or more user devices linked to the group of enrolled devices based on second user account state information corresponding to the second user device. In addition, sending the first notification to the first user device may cause the first user device to require a first set of authenticators when authenticating a user of the first user device, and sending the second notification to the second user device may cause the second user device to require a second set of authenticators when authenticating a user of the second user device. The second user account state information may be different from the first user account state information, and the second set of authenticators may be different from the first set of authenticators. For example, in generating the one or more notifications for the one or more user devices (e.g., client computing device 130, client computing device 140) linked to the group of enrolled devices, client authentication computing platform 110 may generate a first notification for a first user device (e.g., client computing device 130) of the one or more user devices (e.g., client computing device 130, client computing device 140) linked to the group of enrolled devices based on first user account state information corresponding to the first user device (e.g., client computing device 130). In addition, client authentication computing platform 110 may generate a second notification for a second user device (e.g., client computing device 140) of the one or more user devices (e.g., client computing device 130, client computing device 140) linked to the group of enrolled devices based on second user account state information corresponding to the second user device (e.g., client computing device 140). In addition, by sending the first notification to the first user device (e.g., client computing device 130), client authentication computing platform 110 may cause the first user device (e.g., client computing device 130) to require a first set of authenticators when authenticating a user of the first user device (e.g., client computing device 130). And, by sending the second notification to the second user device (e.g., client computing device 140), client authentication computing platform 110 may cause the second user device (e.g., client computing device 140) to require a second set of authenticators when authenticating a user of the second user device (e.g., client computing device 140). Further, the second user account state information (which may, e.g., be associated with client computing device 140) may be different from the first user account state information (which may, e.g., be associated with client computing device 130), and the second set of authenticators for client computing device 140 may be different from the first set of authenticators for client computing device 130 accordingly.

Referring to FIG. 2D, at step 213, client authentication computing platform 110 may send the notifications to the identified user devices (e.g., client computing device 130, client computing device 140). For example, at step 213, client authentication computing platform 110 may send, via the communication interface (e.g., communication interface 113), to the one or more user devices (e.g., client computing device 130, client computing device 140) linked to the group of enrolled devices, the one or more notifications generated for the one or more user devices (e.g., client computing device 130, client computing device 140) linked to the group of enrolled devices. The notifications may, for instance, include device-specific authentication requirements determined by client authentication computing platform 110. In some instances, client authentication computing platform 110 may send such notifications directly to the user devices (e.g., to client computing device 130 and/or client computing device 140). Additionally or alternatively, client authentication computing platform 110 may send such notifications to the user devices (e.g., to client computing device 130 and/or client computing device 140) via a notification server (e.g., notification server 190).

In some embodiments, sending the one or more notifications generated for the one or more user devices linked to the group of enrolled devices may include concurrently sending the one or more notifications to the one or more user devices linked to the group of enrolled devices. For example, in sending the one or more notifications generated for the one or more user devices (e.g., client computing device 130, client computing device 140) linked to the group of enrolled devices, client authentication computing platform 110 may concurrently send the one or more notifications to the one or more user devices linked to the group of enrolled devices (e.g., by sending such notifications at substantially the same time).

In some embodiments, sending the one or more notifications generated for the one or more user devices linked to the group of enrolled devices may include sequentially sending the one or more notifications to the one or more user devices linked to the group of enrolled devices. For example, in sending the one or more notifications generated for the one or more user devices (e.g., client computing device 130, client computing device 140) linked to the group of enrolled devices, client authentication computing platform 110 may sequentially send the one or more notifications to the one or more user devices linked to the group of enrolled devices (e.g., by sending such notifications serially after each notification is responded to by its particular recipient device).

In some embodiments, sending the one or more notifications generated for the one or more user devices linked to the group of enrolled devices may include sending the one or more notifications to the one or more user devices linked to the group of enrolled devices in a specific order based on the multi-push settings associated with the group of enrolled devices. For example, in sending the one or more notifications generated for the one or more user devices (e.g., client computing device 130, client computing device 140) linked to the group of enrolled devices, client authentication computing platform 110 may send the one or more notifications to the one or more user devices (e.g., client computing device 130, client computing device 140) linked to the group of enrolled devices in a specific order based on the multi-push settings associated with the group of enrolled devices. For instance, client authentication computing platform 110 may first send a notification to client computing device 130, and then after client computing device 130 approves, rejects, and/or otherwise responds to the notification, client authentication computing platform 110 may then send a notification to client computing device 140, and so on.

In some embodiments, sending the one or more notifications to the one or more user devices linked to the group of enrolled devices may include sending a first notification to a first user device, and sending the first notification to the first user device may cause the first user device to present information associated with the first notification, authenticate a user of the first user device, present a first prompt corresponding to the event request, and send first prompt response information to the computing platform. For example, in sending the one or more notifications to the one or more user devices (e.g., client computing device 130, client computing device 140) linked to the group of enrolled devices, client authentication computing platform 110 may send a first notification to a first user device (e.g., client computing device 130). In addition, by sending the first notification to the first user device (e.g., client computing device 130), client authentication computing platform 110 may cause the first user device (e.g., client computing device 130) to present information associated with the first notification, authenticate a user of the first user device (e.g., client computing device 130), present a first prompt corresponding to the event request, and send first prompt response information to the computing platform (e.g., client authentication computing platform 110), as illustrated in greater detail below.

In some embodiments, sending the one or more notifications to the one or more user devices linked to the group of enrolled devices may include sending a second notification to a second user device, and sending the second notification to the second user device may cause the second user device to present information associated with the second notification, authenticate a user of the second user device, present a second prompt corresponding to the event request, and send second prompt response information to the computing platform. For example, in sending the one or more notifications to the one or more user devices (e.g., client computing device 130, client computing device 140) linked to the group of enrolled devices, client authentication computing platform 110 may send a second notification to a second user device (e.g., client computing device 140). In addition, by sending the second notification to the second user device (e.g., client computing device 140), client authentication computing platform 110 may cause the second user device (e.g., client computing device 140) to present information associated with the second notification, authenticate a user of the second user device (e.g., client computing device 140), present a second prompt corresponding to the event request, and send second prompt response information to the computing platform (e.g., client authentication computing platform 110), as illustrated in greater detail below.

At step 214, client computing device 130 may receive one of the notifications from client authentication computing platform 110. At step 215, client computing device 130 may present the notification received from client authentication computing platform 110. At step 216, client computing device 130 may authenticate the user of client computing device 130. For example, client computing device 130 may prompt the user of client computing device 130 to enter a username, password, and/or one-time passcode. Additionally or alternatively, client computing device 130 may prompt the user to provide biometric input for validation, such as fingerprint biometric input, voiceprint biometric input, facial image scan biometric input, retinal image scan biometric input, and/or the like. Additionally or alternatively, client computing device 130 may collect and/or validate passive biometric input, such as walking gait biometric input, heartrate biometric input, blood pressure biometric input, and/or the like.

Figure 2E:
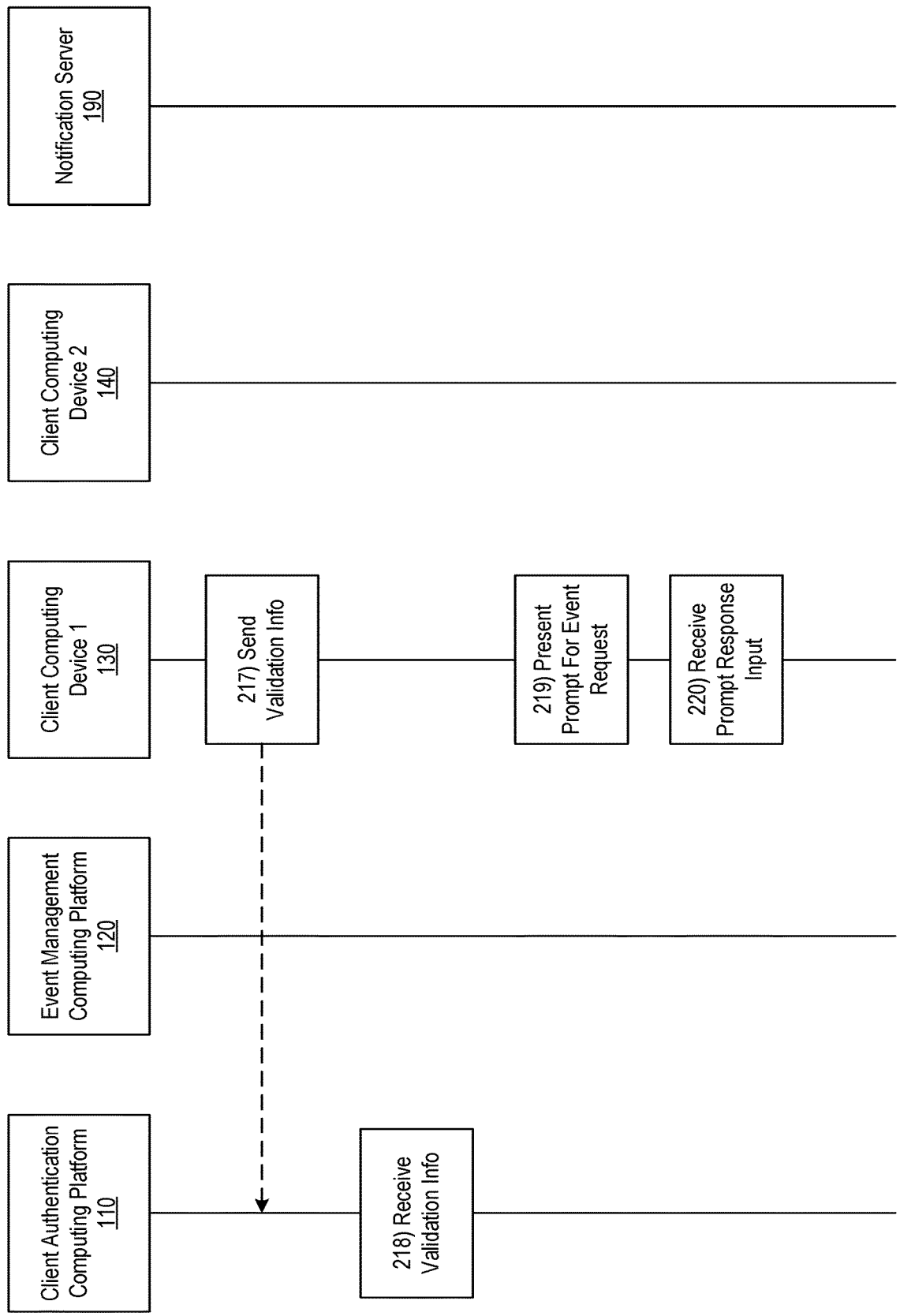

Referring to FIG. 2E, at step 217, client computing device 130 may send validation information to client authentication computing platform 110 (e.g., based on authenticating the user of client computing device 130). Such validation information may, for instance, include authentication input received by client computing device 130 from the user of client computing device 130 and/or data indicating that the user of client computing device 130 provided valid authentication input and has been authenticated. At step 218, client authentication computing platform 110 may receive the validation information from client computing device 130. For example, at step 218, client authentication computing platform 110 may receive, via the communication interface (e.g., communication interface 113), from the first user device (e.g., client computing device 130), validation information associated with the user of the first user device (e.g., client computing device 130) being authenticated.

At step 219, client computing device 130 may present a prompt corresponding to the event request (e.g., based on the contents of the notification received from client authentication computing platform 110 and based on authenticating the user of client computing device 130). The prompt presented by client computing device 130 may, for instance, prompt the user of client computing device 130 to approve or reject the requested event (which may, e.g., be and/or correspond to a request for funds from a teen or minor user, a money transfer request for estate, a transaction for investment club, an endorsement for a joint account, a contractual agreement, a mortgage loan document signing request or transaction, or any other type of transaction which may, for instance, require approval from two or more different entities or users). At step 220, client computing device 130 may receive prompt response input (which may, e.g., be user input received from the user of client computing device 130 indicating that the user of client computing device 130 approved or rejected the requested event).

Referring to FIG. 2F, at step 221, client computing device 130 may send prompt response information to client authentication computing platform 110 (e.g., based on the prompt response input received from the user of client computing device 130). Such prompt response information may, for instance, indicate whether the user of client computing device 130 approved or rejected the event request.

At step 222, client authentication computing platform 110 may receive the prompt response information from client computing device 130. For example, at step 222, client authentication computing platform 110 may receive, via the communication interface (e.g., communication interface 113), from the first user device (e.g., client computing device 130), the first prompt response information. At step 223, client authentication computing platform 110 may update event request state information (e.g., based on the prompt response information received from client computing device 130). For example, at step 223, client authentication computing platform 110 may update event request state information based on receiving the first prompt response information from the first user device (e.g., client computing device 130). For instance, client authentication computing platform 110 may update event request state information to store information indicating what entities and/or users have approved or rejected the event request, information indicating at what time(s) such entities and/or users approved or rejected the event request, information indicating at what location(s) such entities and/or users approved or rejected the event request, information indicating which device(s) were used by such entities and/or users in approving or rejecting the event request, and/or other information.

Figure 3:
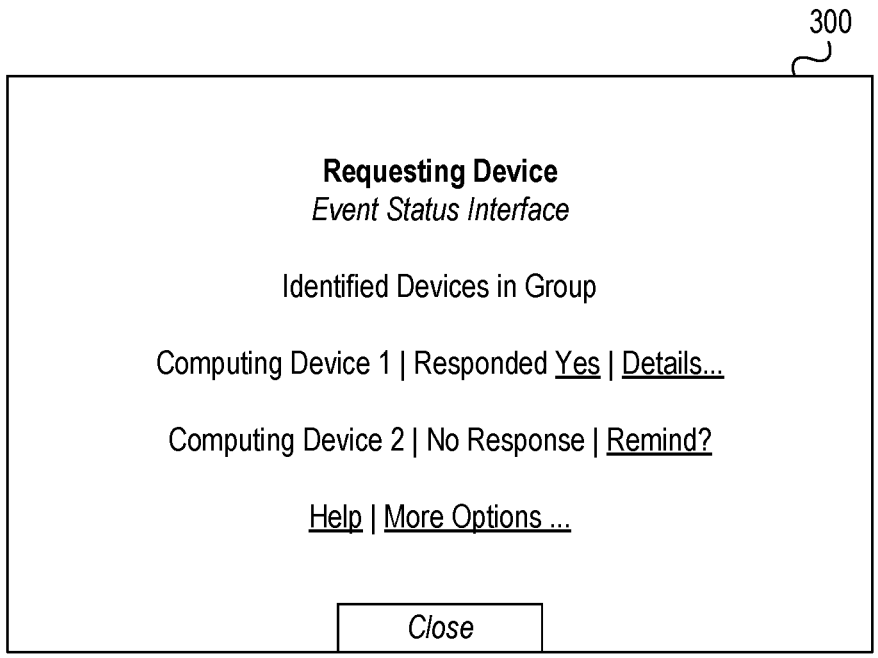
FIGS. 3 and 4 depict example graphical user interfaces for preventing unauthorized access to secured information systems using multi-push authentication techniques in accordance with one or more example embodiments.

At step 224, client authentication computing platform 110 may provide an event status interface (e.g., to the requesting device). For example, at step 224, client authentication computing platform 110 may provide an event status interface to the requesting device based on receiving one or more of the first prompt response information from the first user device (e.g., client computing device 130) or second prompt response information from the second user device (e.g., client computing device 140). In some instances, in providing such an event status interface, client authentication computing platform 110 may cause the requesting device to display and/or otherwise present a graphical user interface similar to graphical user interface 300, which is illustrated in FIG. 3. As seen in FIG. 3, graphical user interface 300 may include text and/or other information indicating which user devices are included in the group associated with the event request, which user devices have responded to notification(s) regarding the event request, which user devices have not responded to notification(s) regarding the event request, and/or other information, as well as one or more controls and/or other user-selectable elements enabling the user of the requesting device to view additional details about the event request, send reminders regarding the event request to particular user devices in the group, and/or perform other functions.

Figure 2G:
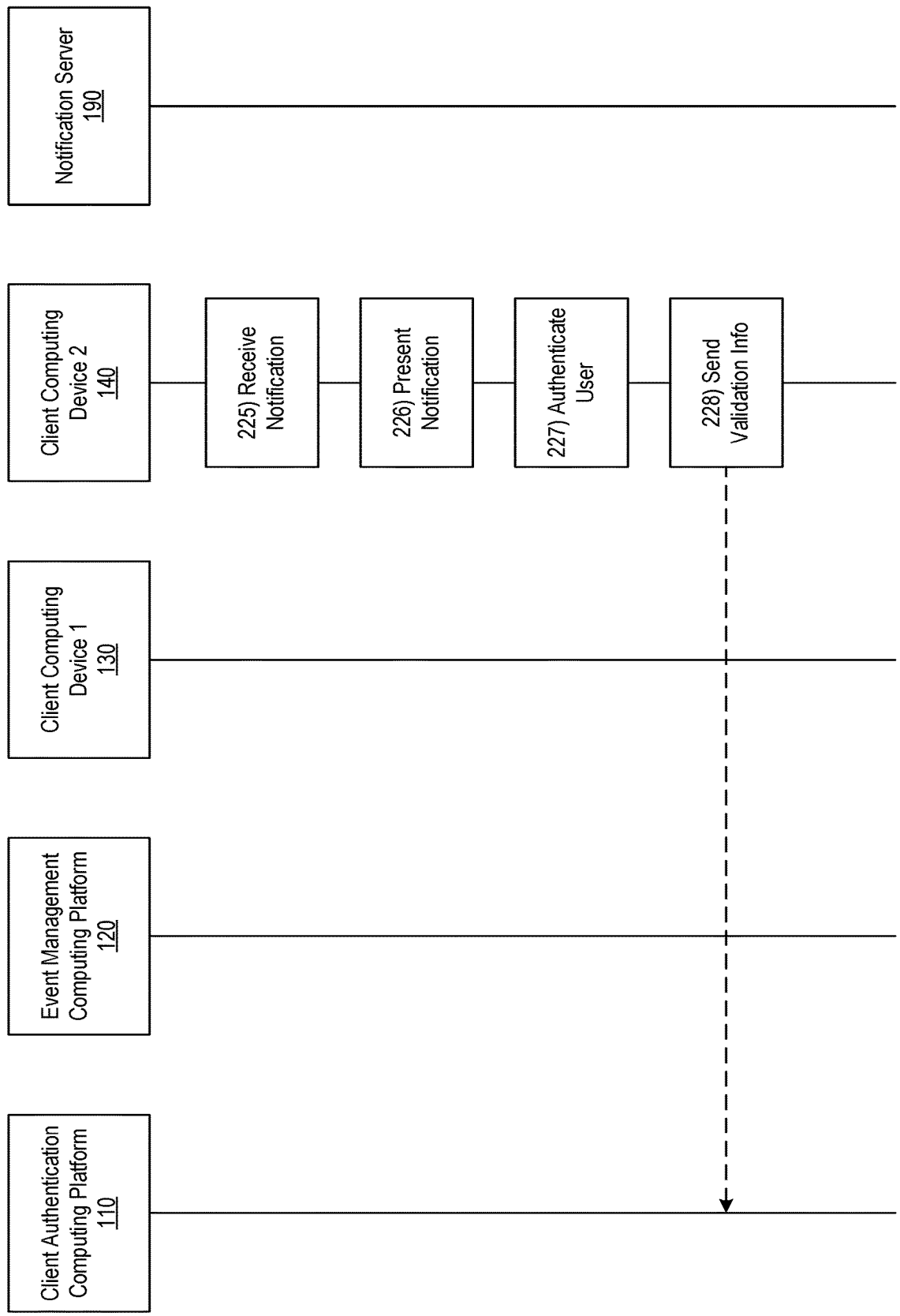

Referring to FIG. 2G, at step 225, client computing device 140 may receive one of the notifications from client authentication computing platform 110. This notification may have been sent by client authentication computing platform 110 and received by client computing device 140 sequentially, after the user of client computing device 130 approved the event request, or may have been sent by client authentication computing platform 110 and received by client computing device 140 concurrently with the notification that was sent by client authentication computing platform 110 to client computing device 130. At step 226, client computing device 140 may present the notification received from client authentication computing platform 110.

At step 227, client computing device 140 may authenticate the user of client computing device 140. For example, client computing device 140 may prompt the user of client computing device 140 to enter a username, password, and/or one-time passcode. Additionally or alternatively, client computing device 140 may prompt the user to provide biometric input for validation, such as fingerprint biometric input, voiceprint biometric input, facial image scan biometric input, retinal image scan biometric input, and/or the like. Additionally or alternatively, client computing device 140 may collect and/or validate passive biometric input, such as walking gait biometric input, heartrate biometric input, blood pressure biometric input, and/or the like.

At step 228, client computing device 140 may send validation information to client authentication computing platform 110 (e.g., based on authenticating the user of client computing device 140). Such validation information may, for instance, include authentication input received by client computing device 140 from the user of client computing device 140 and/or data indicating that the user of client computing device 140 provided valid authentication input and has been authenticated.

Figure 2H:
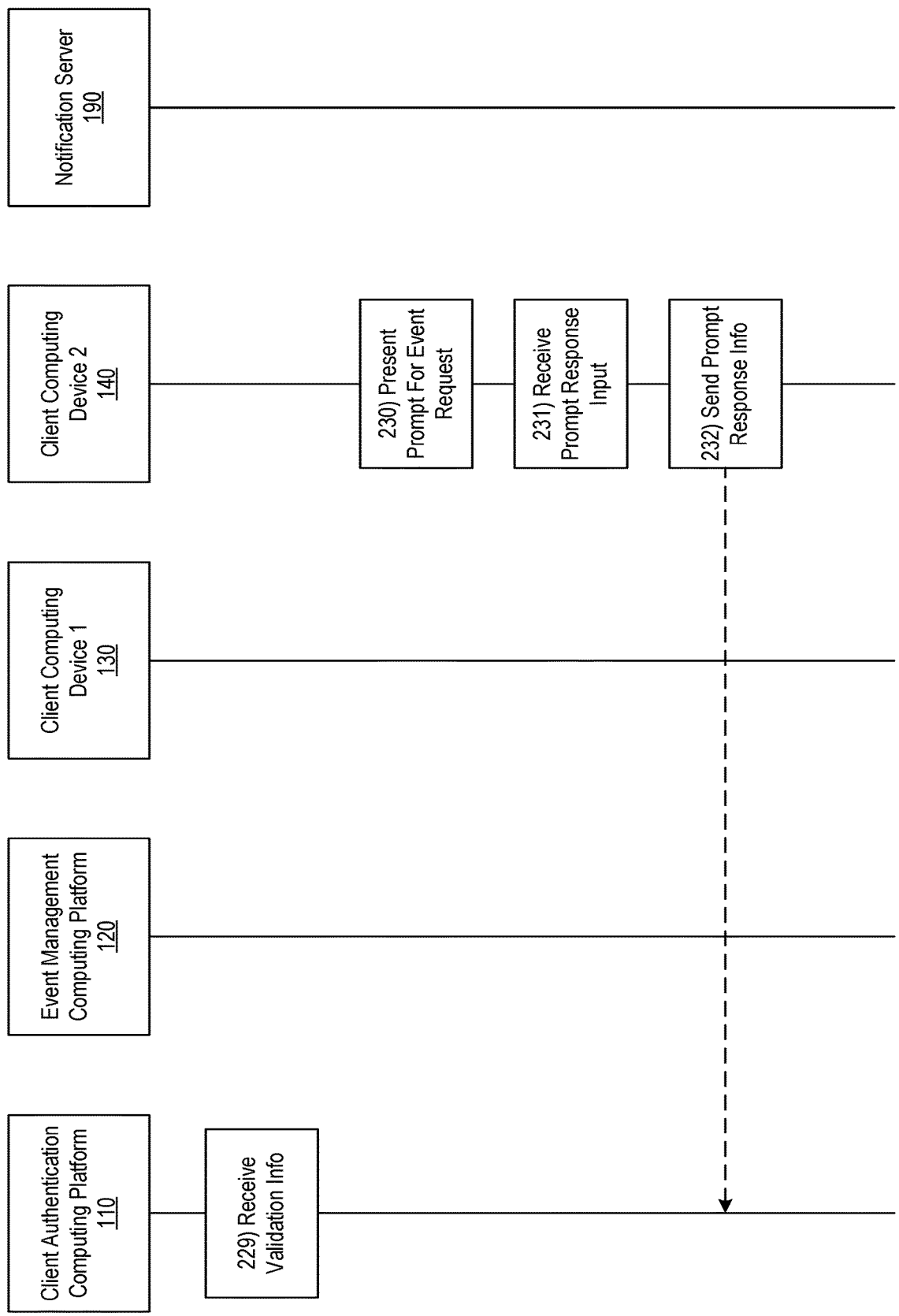

Referring to FIG. 2H, at step 229, client authentication computing platform 110 may receive the validation information from client computing device 140. For example, at step 229, client authentication computing platform 110 may receive, via the communication interface (e.g., communication interface 113), from the second user device (e.g., client computing device 140), validation information associated with the user of the second user device (e.g., client computing device 140) being authenticated.

At step 230, client computing device 140 may present a prompt corresponding to the event request (e.g., based on the contents of the notification received from client authentication computing platform 110 and based on authenticating the user of client computing device 140). The prompt presented by client computing device 140 may, for instance, prompt the user of client computing device 140 to approve or reject the requested event (which may, e.g., be and/or correspond to a request for funds from a teen or minor user, a money transfer request for estate, a transaction for investment club, an endorsement for a joint account, a contractual agreement, a mortgage loan document signing request or transaction, or any other type of transaction which may, for instance, require approval from two or more different entities or users).

At step 231, client computing device 140 may receive prompt response input (which may, e.g., be user input received from the user of client computing device 140 indicating that the user of client computing device 140 approved or rejected the requested event). At step 232, client computing device 140 may send prompt response information to client authentication computing platform 110 (e.g., based on the prompt response input received from the user of client computing device 140). Such prompt response information may, for instance, indicate whether the user of client computing device 140 approved or rejected the event request.

Referring to FIG. 2I, at step 233, client authentication computing platform 110 may receive the prompt response information from client computing device 140. For example, at step 233, client authentication computing platform 110 may receive, via the communication interface (e.g., communication interface 113), from the second user device (e.g., client computing device 140), the second prompt response information. At step 234, client authentication computing platform 110 may update event request state information (e.g., based on the prompt response information received from client computing device 140). For example, at step 234, client authentication computing platform 110 may update the event request state information based on receiving the second prompt response information from the second user device (e.g., client computing device 140). For instance, client authentication computing platform 110 may update event request state information to store information indicating what entities and/or users have approved or rejected the event request, information indicating at what time(s) such entities and/or users approved or rejected the event request, information indicating at what location(s) such entities and/or users approved or rejected the event request, information indicating which device(s) were used by such entities and/or users in approving or rejecting the event request, and/or other information.

At step 235, client authentication computing platform 110 may generate one or more event execution commands (e.g., based on the responses received from the identified user devices). For example, at step 235, client authentication computing platform 110 may generate one or more event execution commands based on prompt response information received from the one or more user devices (e.g., client computing device 130, client computing device 140) linked to the group of enrolled devices. For instance, client authentication computing platform 110 may generate the one or more event execution commands based on specific event conditions being met (e.g., based on all user devices approving the event request or based on a sufficient number of user devices approving the event request, as may be defined in the multi-push settings for the account or group associated with the event request). In some instances, the one or more event execution commands generated by client authentication computing platform 110 may cause a transfer of funds for a teen or minor user, a money transfer to be executed for estate, a transaction to be completed for investment club, an endorsement to be applied for a joint account, a contractual agreement to be signed, a mortgage loan document to be signed, or another type of transaction to be completed based on receiving approval from two or more different entities or users. Alternatively, if one or more user devices rejected the event request, or if the event conditions are otherwise unmet, client authentication computing platform 110 may generate and send one or more error messages to the requesting device and/or one or more other devices.

In some embodiments, generating the one or more event execution commands based on the prompt response information received from the one or more user devices linked to the group of enrolled devices may include generating the one or more event execution commands based on a quorum of the one or more user devices linked to the group of enrolled devices approving the event request. For example, in generating the one or more event execution commands based on the prompt response information received from the one or more user devices (e.g., client computing device 130, client computing device 140) linked to the group of enrolled devices, client authentication computing platform 110 may generate the one or more event execution commands based on a quorum of the one or more user devices (e.g., client computing device 130, client computing device 140) linked to the group of enrolled devices approving the event request. For example, client authentication computing platform 110 may, in some instances, generate the one or more event execution commands at step 235 based on a majority or other predetermined number of user devices approving the event request, even if all of the user devices do not approve of the event request.

In some embodiments, generating the one or more event execution commands based on the prompt response information received from the one or more user devices linked to the group of enrolled devices may include generating the one or more event execution commands based on all of the one or more user devices linked to the group of enrolled devices approving the event request. For example, in generating the one or more event execution commands based on the prompt response information received from the one or more user devices (e.g., client computing device 130, client computing device 140) linked to the group of enrolled devices, client authentication computing platform 110 may generate the one or more event execution commands based on all of the one or more user devices (e.g., client computing device 130, client computing device 140) linked to the group of enrolled devices approving the event request. For example, client authentication computing platform 110 may, in some instances, generate the one or more event execution commands at step 235 only if all of the user devices approve of the event request.

At step 236, client authentication computing platform 110 may send the one or more event execution commands to event management computing platform 120. For example, at step 236, client authentication computing platform 110 may send, via the communication interface (e.g., communication interface 113), to an event management computer system (e.g., event management computing platform 120), the one or more event execution commands generated based on the prompt response information received from the one or more user devices (e.g., client computing device 130, client computing device 140) linked to the group of enrolled devices. In addition, sending the one or more event execution commands to the event management computer system may cause the event management computer system to execute an event corresponding to the event request associated with the group of enrolled devices received from the requesting device. For example, by sending the one or more event execution commands to the event management computer system (e.g., event management computing platform 120), client authentication computing platform 110 may cause the event management computer system (e.g., event management computing platform 120) to execute an event corresponding to the event request associated with the group of enrolled devices received from the requesting device. In this way, client authentication computing platform 110 may facilitate, coordinate, and control processing of the event request received from the requesting device based on the multi-push settings, the device-specific state information, and the responses received from the group of enrolled devices.

Figure 4:
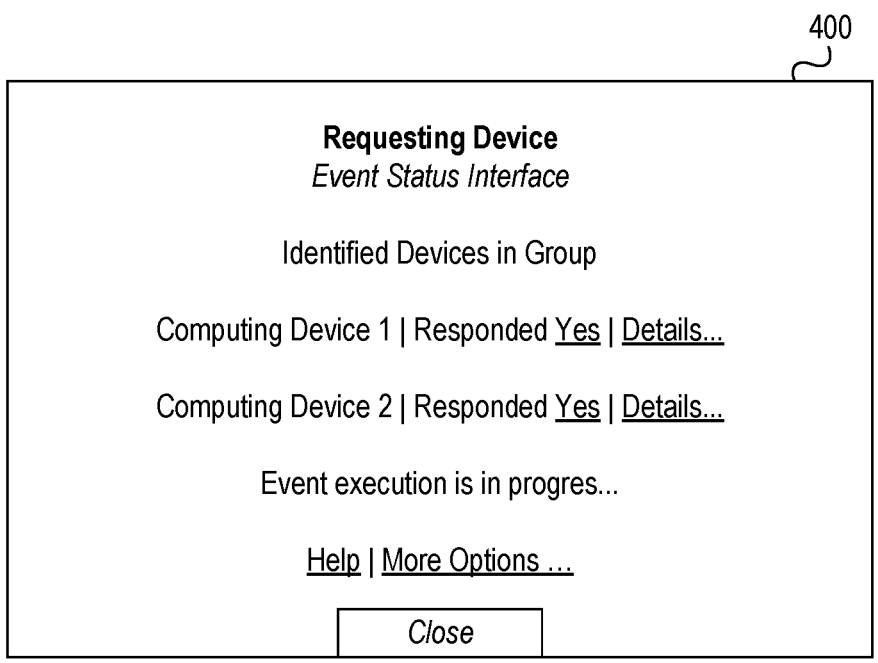

In some instances, based on generating and/or sending the one or more event execution commands to event management computing platform 120, client authentication computing platform 110 also may provide an updated event status interface (e.g., to the requesting device). For example, client authentication computing platform 110 may provide an updated event status interface to the requesting device based on receiving prompt response information from the group of enrolled devices. In providing such an event status interface, client authentication computing platform 110 may cause the requesting device to display and/or otherwise present a graphical user interface similar to graphical user interface 400, which is illustrated in FIG. 4. As seen in FIG. 4, graphical user interface 400 may include text and/or other information indicating which user devices are included in the group associated with the event request, which user devices have responded to notification(s) regarding the event request, which user devices have not responded to notification(s) regarding the event request, and/or other information, such as information indicating that event execution is in progress, as well as one or more controls and/or other user-selectable elements enabling the user of the requesting device to view additional details about the event request and/or perform other functions.

Figure 5:
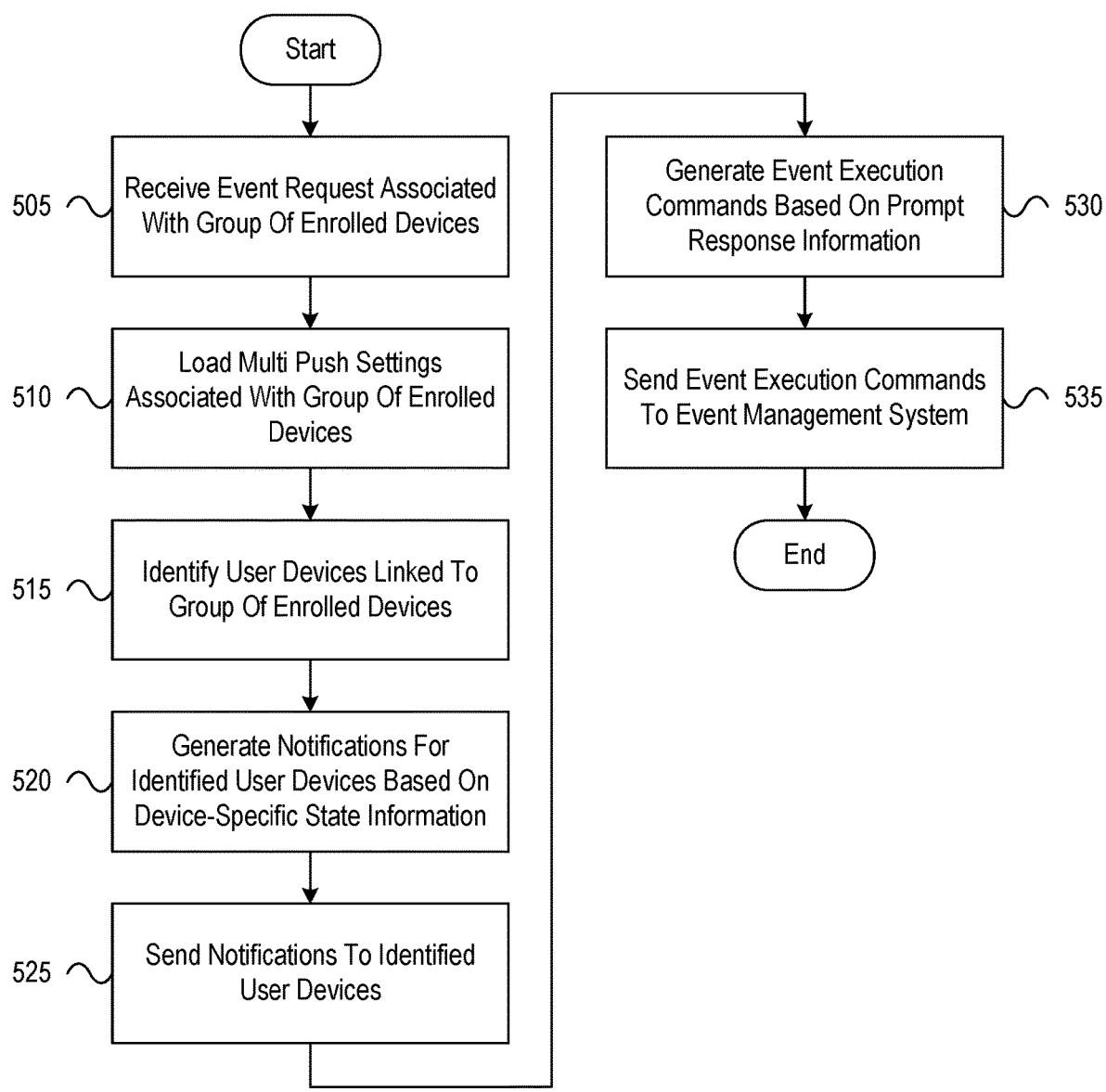
FIG. 5 depicts an illustrative method for preventing unauthorized access to secured information systems using multi-push authentication techniques in accordance with one or more example embodiments.

FIG. 5 depicts an illustrative method for preventing unauthorized access to secured information systems using multi-push authentication techniques in accordance with one or more example embodiments. Referring to FIG. 5, at step 505, a computing platform having at least one processor, a communication interface, and memory may receive, via the communication interface, from a requesting device, an event request associated with a group of enrolled devices. At step 510, based on receiving the event request associated with the group of enrolled devices from the requesting device, the computing platform may load multi-push settings associated with the group of enrolled devices. At step 515, the computing platform may identify one or more user devices linked to the group of enrolled devices based on the multi-push settings associated with the group of enrolled devices.

At step 520, the computing platform may generate one or more notifications for the one or more user devices linked to the group of enrolled devices. In addition, each notification of the one or more notifications may be generated for a corresponding user device of the one or more user devices linked to the group of enrolled devices based on device-specific user account state information maintained by the computing platform. At step 525, the computing platform may send, via the communication interface, to the one or more user devices linked to the group of enrolled devices, the one or more notifications generated for the one or more user devices linked to the group of enrolled devices. At step 530, the computing platform may generate one or more event execution commands based on prompt response information received from the one or more user devices linked to the group of enrolled devices. At step 535, the computing platform may send, via the communication interface, to an event management computer system, the one or more event execution commands generated based on the prompt response information received from the one or more user devices linked to the group of enrolled devices. In addition, sending the one or more event execution commands to the event management computer system may cause the event management computer system to execute an event corresponding to the event request associated with the group of enrolled devices received from the requesting device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, from a requesting device, an event request associated with a group of enrolled devices;
   based on receiving the event request associated with the group of enrolled devices from the requesting device, load multi-push settings associated with the group of enrolled devices;
   identify one or more user devices linked to the group of enrolled devices based on the multi-push settings associated with the group of enrolled devices;
   generate one or more notifications for the one or more user devices linked to the group of enrolled devices, wherein each notification of the one or more notifications is generated for a corresponding user device of the one or more user devices linked to the group of enrolled devices based on device-specific user account state information maintained by the computing platform, and wherein generating the one or more notifications for the one or more user devices linked to the group of enrolled devices comprises:
   generating a first notification for a first user device of the one or more user devices linked to the group of enrolled devices based on first user account state information corresponding to the first user device, wherein sending the first notification to the first user device causes the first user device to require a first set of authenticators when authenticating a user of the first user device; and
   generating a second notification for a second user device of the one or more user devices linked to the group of enrolled devices based on second user account state information corresponding to the second user device, wherein sending the second notification to the second user device causes the second user device to require a second set of authenticators when authenticating a user of the second user device, wherein the second user account state information is different from the first user account state information, and wherein the second set of authenticators is different from the first set of authenticators;

send, via the communication interface, to the one or more user devices linked to the group of enrolled devices, the one or more notifications generated for the one or more user devices linked to the group of enrolled devices;

generate one or more event execution commands based on prompt response information received from the one or more user devices linked to the group of enrolled devices; and send, via the communication interface, to an event management computer system, the one or more event execution commands generated based on the prompt response information received from the one or more user devices linked to the group of enrolled devices, wherein sending the one or more event execution commands to the event management computer system causes the event management computer system to execute an event corresponding to the event request associated with the group of enrolled devices received from the requesting device.

2. The computing platform of claim 1, wherein sending the one or more notifications generated for the one or more user devices linked to the group of enrolled devices comprises concurrently sending the one or more notifications to the one or more user devices linked to the group of enrolled devices.

3. The computing platform of claim 1, wherein sending the one or more notifications generated for the one or more user devices linked to the group of enrolled devices comprises sequentially sending the one or more notifications to the one or more user devices linked to the group of enrolled devices.

4. The computing platform of claim 3, wherein sending the one or more notifications generated for the one or more user devices linked to the group of enrolled devices comprises sending the one or more notifications to the one or more user devices linked to the group of enrolled devices in a specific order based on the multi-push settings associated with the group of enrolled devices.

5. The computing platform of claim 1, wherein generating the one or more event execution commands based on the prompt response information received from the one or more user devices linked to the group of enrolled devices comprises generating the one or more event execution commands based on a quorum of the one or more user devices linked to the group of enrolled devices approving the event request.

6. The computing platform of claim 1, wherein generating the one or more event execution commands based on the prompt response information received from the one or more user devices linked to the group of enrolled devices comprises generating the one or more event execution commands based on all of the one or more user devices linked to the group of enrolled devices approving the event request.

7. The computing platform of claim 1, wherein sending the one or more notifications to the one or more user devices linked to the group of enrolled devices comprises sending the first notification to the first user device, and wherein sending the first notification to the first user device causes the first user device to present information associated with the first notification, authenticate the user of the first user device, present a first prompt corresponding to the event request, and send first prompt response information to the computing platform.

8. The computing platform of claim 7, wherein sending the one or more notifications to the one or more user devices linked to the group of enrolled devices comprises sending the second notification to the second user device, and wherein sending the second notification to the second user device causes the second user device to present information associated with the second notification, authenticate the user of the second user device, present a second prompt corresponding to the event request, and send second prompt response information to the computing platform.

9. The computing platform of claim 8, wherein the memory stores additional computer-readable instructions that, when executed by the at least one processor, cause the computing platform to:

receive, via the communication interface, from the first user device, validation information associated with the user of the first user device being authenticated.

10. The computing platform of claim 9, wherein the memory stores additional computer-readable instructions that, when executed by the at least one processor, cause the computing platform to:

receive, via the communication interface, from the first user device, the first prompt response information; and update event request state information based on receiving the first prompt response information from the first user device.

11. The computing platform of claim 10, wherein the memory stores additional computer-readable instructions that, when executed by the at least one processor, cause the computing platform to:

receive, via the communication interface, from the second user device, validation information associated with the user of the second user device being authenticated.

12. The computing platform of claim 11, wherein the memory stores additional computer-readable instructions that, when executed by the at least one processor, cause the computing platform to:

receive, via the communication interface, from the second user device, the second prompt response information; and update the event request state information based on receiving the second prompt response information from the second user device.

13. The computing platform of claim 12, wherein the memory stores additional computer-readable instructions that, when executed by the at least one processor, cause the computing platform to:

provide an event status interface to the requesting device based on receiving one or more of the first prompt response information from the first user device or the second prompt response information from the second user device.

14. A method, comprising:

at a computing platform comprising at least one processor, a communication interface, and memory:

receiving, by the at least one processor, via the communication interface, from a requesting device, an event request associated with a group of enrolled devices;

based on receiving the event request associated with the group of enrolled devices from the requesting device, loading, by the at least one processor, multi-push settings associated with the group of enrolled devices;

identifying, by the at least one processor, one or more user devices linked to the group of enrolled devices based on the multi-push settings associated with the group of enrolled devices;

generating, by the at least one processor, one or more notifications for the one or more user devices linked to the group of enrolled devices, wherein each notification of the one or more notifications is generated for a corresponding user device of the one or more user devices linked to the group of enrolled devices based on device-specific user account state information maintained by the computing platform, and wherein generating the one or more notifications for the one or more user devices linked to the group of enrolled devices comprises:

generating a first notification for a first user device of the one or more user devices linked to the group of enrolled devices based on first user account state information corresponding to the first user device, wherein sending the first notification to the first user device causes the first user device to require a first set of authenticators when authenticating a user of the first user device; and generating a second notification for a second user device of the one or more user devices linked to the group of enrolled devices based on second user account state information corresponding to the second user device, wherein sending the second notification to the second user device causes the second user device to require a second set of authenticators when authenticating a user of the second user device, wherein the second user account state information is different from the first user account state information, and wherein the second set of authenticators is different from the first set of authenticators;

sending, by the at least one processor, via the communication interface, to the one or more user devices linked to the group of enrolled devices, the one or more notifications generated for the one or more user devices linked to the group of enrolled devices;

generating, by the at least one processor, one or more event execution commands based on prompt response information received from the one or more user devices linked to the group of enrolled devices; and sending, by the at least one processor, via the communication interface, to an event management computer system, the one or more event execution commands generated based on the prompt response information received from the one or more user devices linked to the group of enrolled devices, wherein sending the one or more event execution commands to the event management computer system causes the event management computer system to execute an event corresponding to the event request associated with the group of enrolled devices received from the requesting device.

15. The method of claim 14, wherein sending the one or more notifications generated for the one or more user devices linked to the group of enrolled devices comprises concurrently sending the one or more notifications to the one or more user devices linked to the group of enrolled devices.

16. The method of claim 14, wherein sending the one or more notifications generated for the one or more user devices linked to the group of enrolled devices comprises sequentially sending the one or more notifications to the one or more user devices linked to the group of enrolled devices.

17. The method of claim 16, wherein sending the one or more notifications generated for the one or more user devices linked to the group of enrolled devices comprises sending the one or more notifications to the one or more user devices linked to the group of enrolled devices in a specific order based on the multi-push settings associated with the group of enrolled devices.

18. The method of claim 14, wherein generating the one or more event execution commands based on the prompt response information received from the one or more user devices linked to the group of enrolled devices comprises generating the one or more event execution commands based on a quorum of the one or more user devices linked to the group of enrolled devices approving the event request.

19. The method of claim 14, wherein generating the one or more event execution commands based on the prompt response information received from the one or more user devices linked to the group of enrolled devices comprises generating the one or more event execution commands based on all of the one or more user devices linked to the group of enrolled devices approving the event request.

20. One or more non-transitory computer-readable media storing instructions that, when executed by a computing platform comprising at least one processor, a communication interface, and memory, cause the computing platform to:

receive, via the communication interface, from a requesting device, an event request associated with a group of enrolled devices;

based on receiving the event request associated with the group of enrolled devices from the requesting device, load multi-push settings associated with the group of enrolled devices;

identify one or more user devices linked to the group of enrolled devices based on the multi-push settings associated with the group of enrolled devices;

generate one or more notifications for the one or more user devices linked to the group of enrolled devices, wherein each notification of the one or more notifications is generated for a corresponding user device of the one or more user devices linked to the group of enrolled devices based on device-specific user account state information maintained by the computing platform, and wherein generating the one or more notifications for the one or more user devices linked to the group of enrolled devices comprises:

generating a first notification for a first user device of the one or more user devices linked to the group of enrolled devices based on first user account state information corresponding to the first user device, wherein sending the first notification to the first user device causes the first user device to require a first set of authenticators when authenticating a user of the first user device; and generating a second notification for a second user device of the one or more user devices linked to the group of enrolled devices based on second user account state information corresponding to the second user device, wherein sending the second notification to the second user device causes the second user device to require a second set of authenticators when authenticating a user of the second user device, wherein the second user account state information is different from the first user account state information, and wherein the second set of authenticators is different from the first set of authenticators;

send, via the communication interface, to the one or more user devices linked to the group of enrolled devices, the one or more notifications generated for the one or more user devices linked to the group of enrolled devices;

generate one or more event execution commands based on prompt response information received from the one or more user devices linked to the group of enrolled devices; and send, via the communication interface, to an event management computer system, the one or more event execution commands generated based on the prompt response information received from the one or more user devices linked to the group of enrolled devices, wherein sending the one or more event execution commands to the event management computer system causes the event management computer system to execute an event corresponding to the event request associated with the group of enrolled devices received from the requesting device.

\* \* \* \* \*